US006637835B2

(12) United States Patent
Morris

(10) Patent No.: US 6,637,835 B2
(45) Date of Patent: Oct. 28, 2003

(54) PLASTIC WHEEL ASSEMBLY AND MOUNTING SLEEVE WITH STABILIZING RECESS

(75) Inventor: Michael A. Morris, Menlo Park, CA (US)

(73) Assignee: GEO Plastics, Los Angeles, CA (US)

( * ) Notice: Subject to any disclaimer, the term of this patent is extended or adjusted under 35 U.S.C. 154(b) by 0 days.

(21) Appl. No.: 10/044,621

(22) Filed: Jan. 9, 2002

(65) Prior Publication Data
US 2002/0089229 A1 Jul. 11, 2002

Related U.S. Application Data

(63) Continuation-in-part of application No. 09/687,669, filed on Oct. 12, 2000, now Pat. No. 6,361,121, which is a continuation-in-part of application No. 09/507,595, filed on Feb. 18, 2000.

(51) Int. Cl.[7] ............................................... B60B 23/00
(52) U.S. Cl. ....................................... 301/111; 301/132
(58) Field of Search ................................. 301/111, 112, 301/118, 131, 132

(56) References Cited

U.S. PATENT DOCUMENTS

| 486,023 | A |  | 11/1892 | Bermel |  |
|---|---|---|---|---|---|
| 2,978,277 | A |  | 4/1961 | Gaudry |  |
| 3,907,370 | A |  | 9/1975 | Bard |  |
| 5,215,356 | A |  | 6/1993 | Lin |  |
| 5,222,786 | A |  | 6/1993 | Sovis et al. |  |
| 5,277,480 | A |  | 1/1994 | Chiu |  |
| 5,603,555 | A |  | 2/1997 | Dickey et al. |  |
| 5,716,107 | A |  | 2/1998 | Parker et al. |  |
| 5,902,018 | A |  | 5/1999 | Owens et al. |  |
| 6,099,083 | A |  | 8/2000 | Logan |  |
| 6,280,001 | B1 | * | 8/2001 | Parker et al. | 301/111.03 |
| 6,299,258 | B1 | * | 10/2001 | Wright et al. | 301/124.1 |
| 6,409,283 | B1 | * | 6/2002 | Hsieh | 190/18 A |

FOREIGN PATENT DOCUMENTS

EP          180307          5/1986

* cited by examiner

Primary Examiner—S. Joseph Morano
Assistant Examiner—Long Bao Nguyen
(74) Attorney, Agent, or Firm—Dorsey & Whitney LLP; Robert B. Chickering

(57) ABSTRACT

A plastic wheel (122, 222) and wheel mounting sleeve (127, 227, 327, 427) used to releasably secure the wheel (122, 222) onto an axle (123, 223). The wheel mounting sleeve (127, 227, 327, 427) preferably includes a resilient, radially displaceable, axially extending, cantilevered finger (146, 246, 346, 446) which includes an axle-engaging lug (155, 255, 355, 455), while a wheel-engaging shoulder is provided on the sleeve by an annular rib (201, 301). The sleeve shoulders latch the sleeve (127, 227, 327, 427) to the axle (123, 223) and the wheel (122, 222) to the sleeve. The sleeve (127, 227, 327, 427) includes an axle stabilizing recess (198, 298, 398, 498) positioned in an end wall (158, 258, 358, 458), which receives an axle stub (199, 299) that supports the axle (123, 223) against lateral loading and stabilizes it to reduce wobble, chatter and vibration.

20 Claims, 8 Drawing Sheets

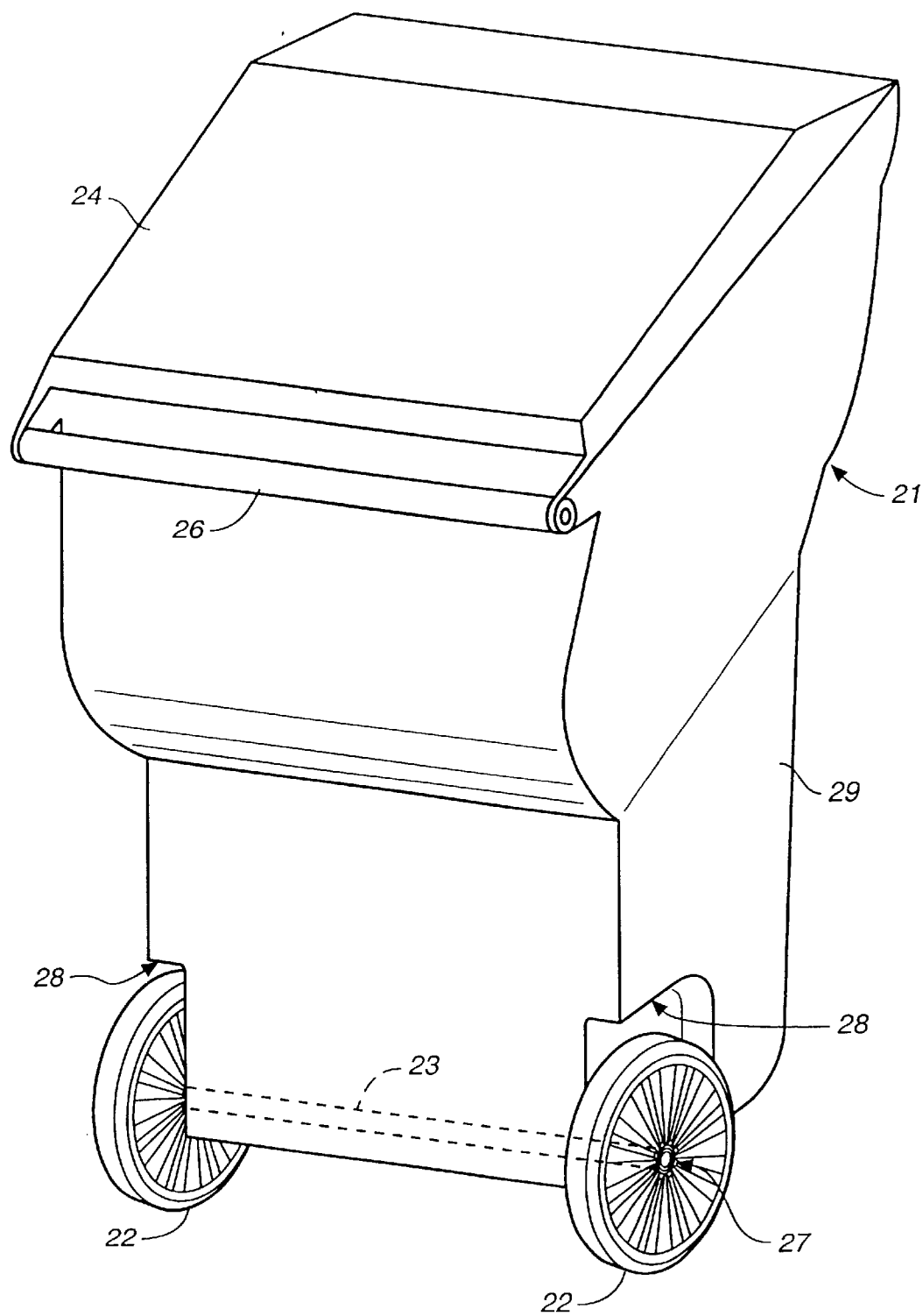
FIG._1

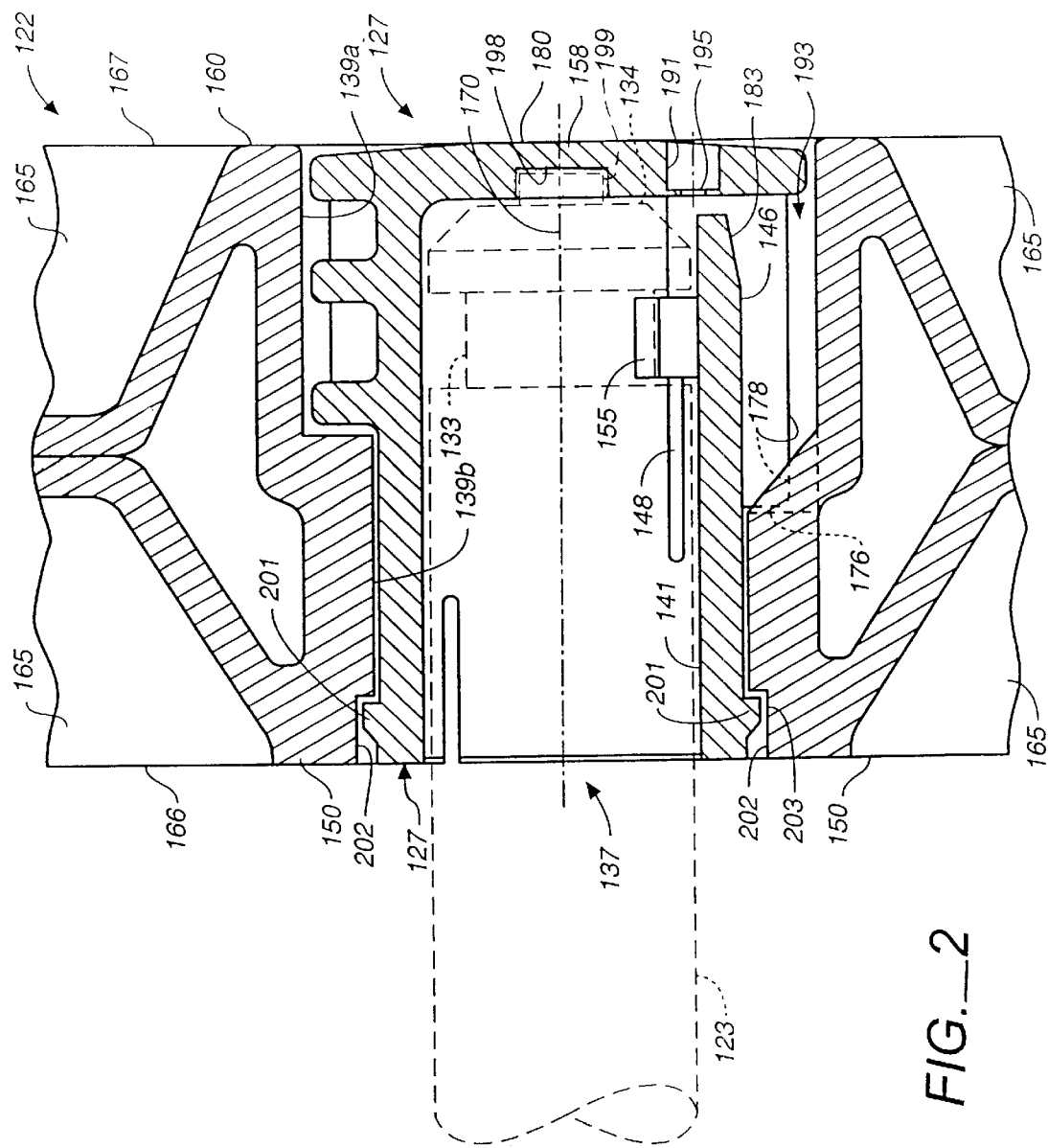
FIG._2

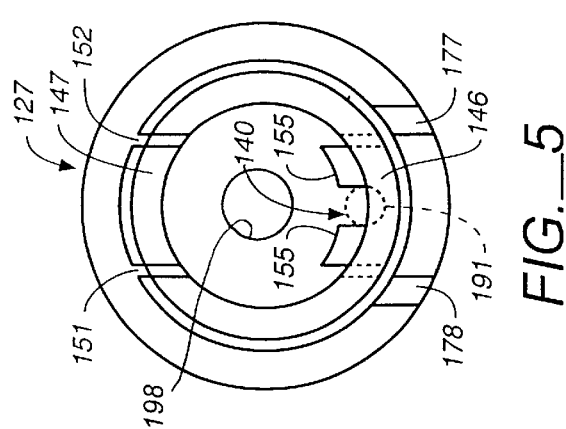
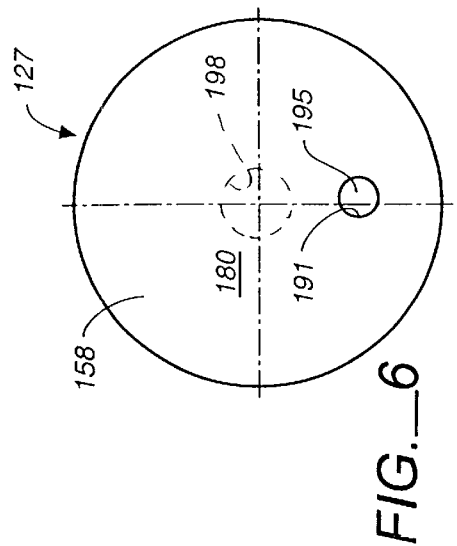
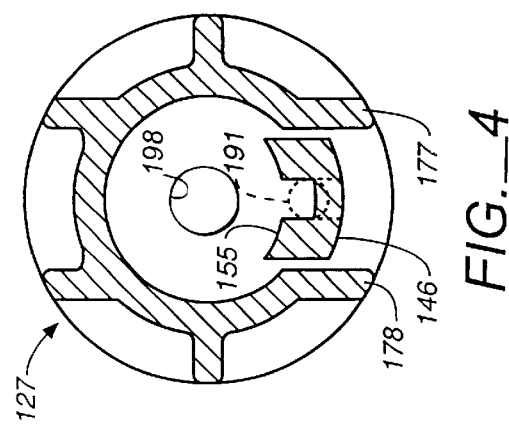
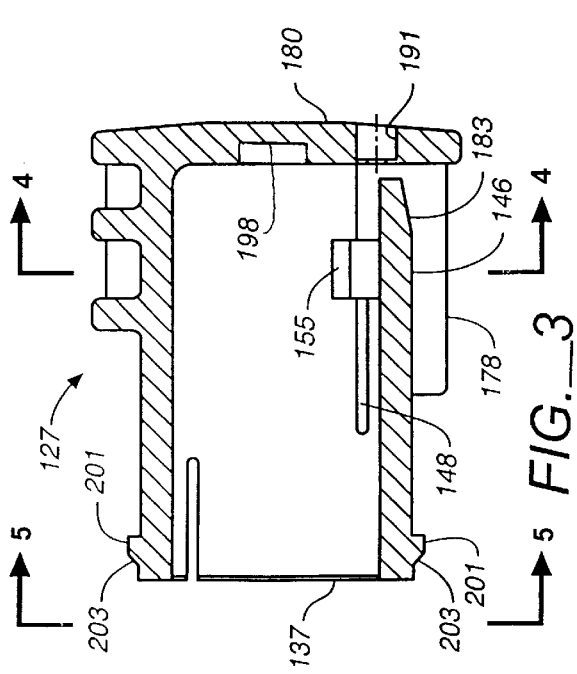
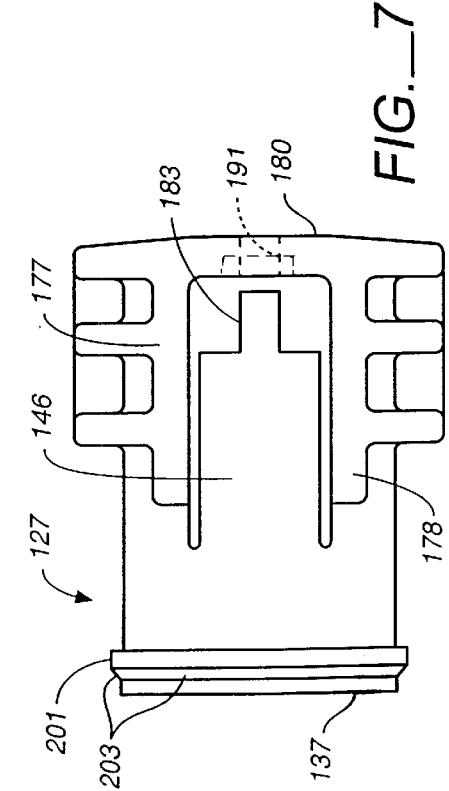

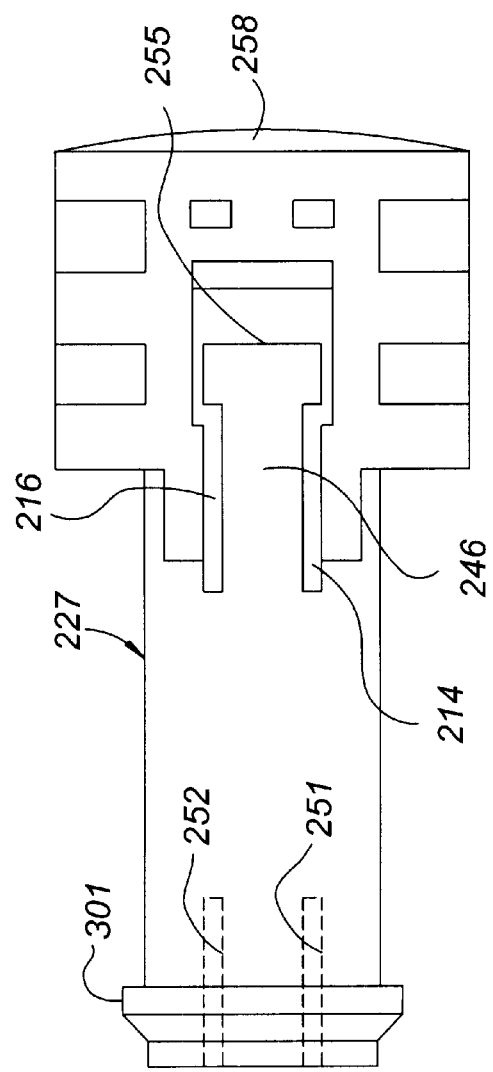
FIG._10
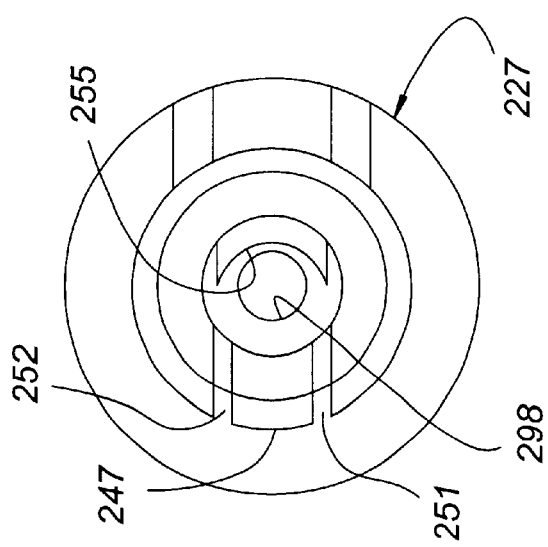
FIG._12

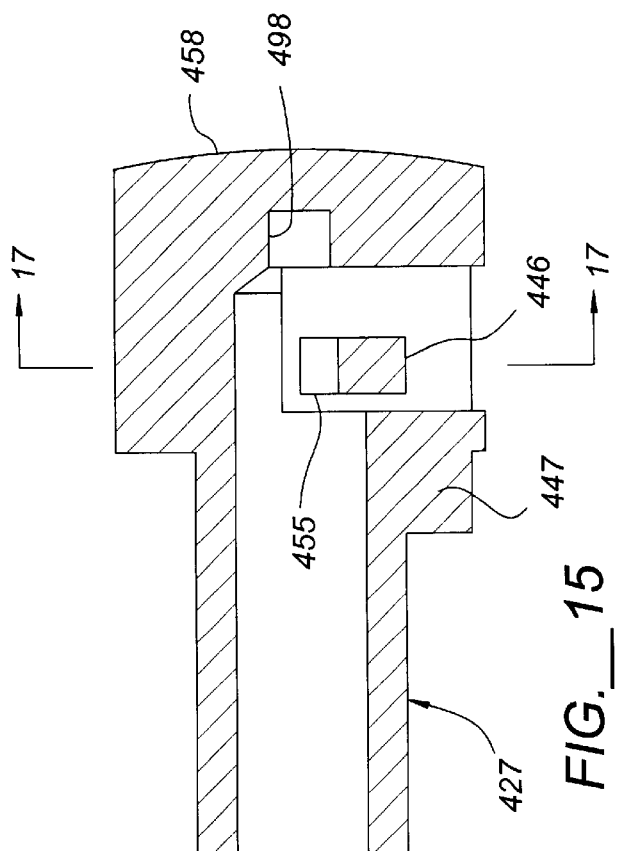
FIG._15
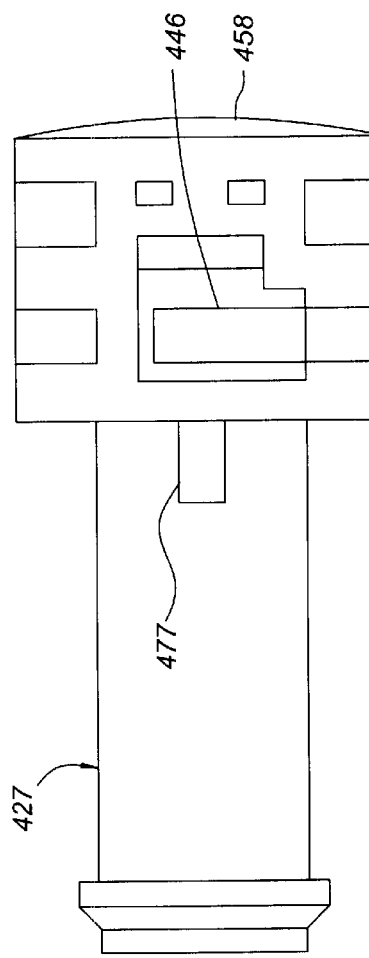
FIG._16
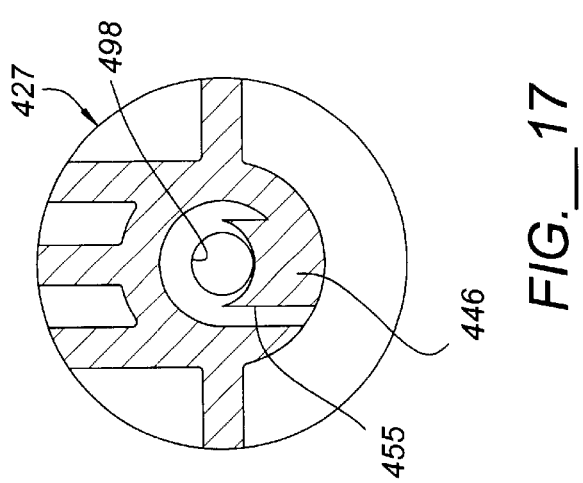
FIG._17

US 6,637,835 B2

PLASTIC WHEEL ASSEMBLY AND MOUNTING SLEEVE WITH STABILIZING RECESS

RELATED APPLICATION

This is a continuation-in-part application based upon application Ser. No. 09/687,669, filed Oct. 12, 2000 now U.S. Pat. No. 6,361,121 and entitled PLASTIC WHEEL ASSEMBLY AND IMPROVED MOUNTING SLEEVE THEREFOR, which was a continuation-in-part application based upon application Ser. No. 09/507,595, filed Feb. 18, 2000, and entitled PLASTIC WHEEL ASSEMBLY AND MOUNTING SLEEVE THEREFOR.

TECHNICAL FIELD

The present invention relates, in general, to wheel assemblies and the manner of their mounting to and removal from an axle, and more particularly, relates to plastic wheel assemblies of the type used on refuse carts, wheeled coolers, wagons, wheeled toys, barbecues or the like.

BACKGROUND ART

The use of plastic wheels on a variety of products has dramatically increased in recent years. One area where such plastic wheels have been widely employed is on wheeled refuse or garbage carts or bins of the type commonly employed by homeowners for their trash. Typically, these carts are formed of an injection, blow or rotationally molded plastic and have injection or blow molded plastic wheels which are mounted on the ends of a metal axle by a hub member. The wheel hub is hammered onto the end of the axle to hold the wheel in place. Removal of such plastic wheels in order to replace or repair the wheel or the cart has been difficult because the hammered hubs require special tools for their removal or essentially must be destroyed to remove them from the axle. Sometimes this process also damages the axles. Thus, more recently, wheel-mounting assemblies have been devised which snap-on to the axle to hold the wheel to the axle.

As the size of the axle and wheel are reduced, for example, when such wheel assemblies are used on wheeled toys, wagons, coolers or the like, the amount of material which can be employed in a wheel mounting sleeve to stabilize the coupling of the axle to the wheel decreases. Since such mounting sleeves often employ resiliently transversely displaceable fingers to lock or latch the wheel to the axle, the area of the sleeve which includes the displaceable finger tends to be somewhat less stable and less capable of supporting shifting or rocking along ther axle and transverse loads on the axle. The stability decreases as the sleeve size decreases and there is less material to engage and hold onto, or latch to, the axle and to resist axial shifting and transverse loading in the area of the resiliently transversely displaceable fingers, which usually are located proximate an outer end of the axle.

Prior art snap-on wheel-mounting assemblies have been unduly complex, visually unappealing, and not well suited to the shock loading and vibration which is commonly encountered. They also are not easily adaptable for use on smaller axles and smaller wheeled products. Moreover, the cost of prior art snap-on couplings has been undesirably high, as has their rate of failure.

Typical prior art wheel-mounting assemblies can be seen in U.S. Pat. Nos. 486,023, 2,978,277, 3,907,370, 5,215,356, 5,222,786, 5,277,480, 5,603,555, 5,716,107, 5,902,018 and 6,099,083 and in published European Patent Application No. 0 180 307.

U.S. Pat. No. 486,023 to Bermel discloses an axle nut used to secure a wheel on a somewhat involved axle structure. Another wheel retaining axle nut is shown in U.S. Pat. No. 6,099,083 that also is designed for use with a cooperatively formed and unique notched axle.

In U.S. Pat. No. 2,978,277 to Gaudry a two-piece hub assembly is used to secure a wheel on an axle stub. The two hub halves are forced together to simultaneously capture the head of the axle and a dove-tailed cross section of the wheel. This approach is based, in part, upon mating frictional engagement of the hub halves, but under the shock loading and high vibration which refuse carts, cooler and toys typically experience, frictional securement of components can be unreliable. The need for multiple hub pieces and an axle with an enlarged head, also is not desirable and the end of the axle is not supported well against transverse loading.

The wheel-mounting assembly of U.S. Pat. No. 3,907,370 to Bard employs a mounting sleeve which is keyed to slide over the keyed end of a specially formed axle. The sleeve mates with spokes in a wheel recess and is held in place by a washer and cotter pin. An annular cap is placed over the cotter pin and washer. This approach requires axle keying, a plurality of parts, the use of tools to secure and release the cotter pin and cap, and a laterally unsupported axle end.

A multiple piece hub assembly is shown in U.S. Pat. No. 5,716,107 to Parker et al. In this wheel-mounting assembly a retainer member is used to lock the wheel assembly on a groove or annular notch at the end of the axle. The hub cover is snapped into the wheel and then the wheel snapped onto the axle. Such notched or grooved axles are in wide spread use in connection with trash carts, but this assembly again requires multiple pieces and, in this case, special tools and tedious manipulation are required in order to release the resilient retainer ring fingers from the inside of the wheel so that the wheel can be removed from the axle. A similar snap-on hub assembly is shown in U.S. Pat. No. 5,215,356. In both U.S. Pat. Nos. 5,716,107 and 5,215,356 the wheel securing device is not a sleeve which extends through the wheel bore.

Four patents which employ sleeve assemblies formed for mounting through the wheel in telescoped relation over the axle are shown in U.S. Pat. Nos. 5,222,786, 5,277,480, 5,603,555 and 5,902,018. The devices of U.S. Pat. Nos. 5,222,786 and 5,603,555 have sleeves with at least one snap-acting, axle-engaging shoulder thereon which releasably retains the sleeve on the axle and at least one wheel-engaging shoulder retaining the wheel on the sleeve. As will be seen, however, both of the wheel-mounting sleeve assemblies in these patents are relatively complex and employ a plurality of pieces in order to secure the wheel on the axle. As the wheel and axle size reduces, therefore, these assemblies become more difficult to employ.

In U.S. Pat. Nos. 5,277,480 and 5,902,018 separate retainer devices are used with sleeves, but the outer ends of the axles are essentially unsupported and hub covers must be employed for safety and/or aesthetic reasons.

Finally, in European publication No. 0 180 307 collets are provided on an inwardly cantilevered stub of the wheel to grip a notch formed in the axle. No through-the-wheel sleeve is employed in this assembly.

Accordingly, it is an object of the present invention to provide a wheel assembly and wheel mounting sleeve having a minimum number of parts which can be used to mount plastic wheels, and particularly relatively small wheels, to relatively small diameter notched or grooved metal axles.

A further object of the present invention is to provide a plastic wheel assembly for a trash cart, wagon, cooler or other wheeled product which is economical to manufacture, easy to mount to the axle, and is durable, stable and capable of withstanding substantial shock loads, side-to-side shifting and vibration during normal use.

The wheel assembly and wheel mounting sleeve of the present invention have other objects and features of advantage which will become apparent from, and are set forth in more detail in, the accompanying Drawing and following Best Mode Of Carrying Out The Invention.

DISCLOSURE OF INVENTION

The wheel mounting sleeve of the present invention includes a sleeve body formed and dimensioned for mounting through a central wheel bearing bore of a wheel and formed with a sleeve bore dimensioned to be telescoped over an axle. The sleeve has at least one axle-engaging shoulder releasably retaining the sleeve on the axle and at least one wheel-engaging shoulder retaining the wheel on the sleeve. The improvement in the mounting sleeve of the present invention is comprised, briefly, of the sleeve body being formed with a transversely extending end wall having an axle stabilizing or supporting recess or bore segment therein dimensioned to receive the distal end of the axle and dimensioned to support the axle at its end against transverse loads and axial shifting.

A wheel assembly, including a wheel, mounting sleeve and axle telescoped together is also provided.

BRIEF DESCRIPTION OF THE DRAWING

FIG. 1 is a top perspective view of a refuse cart or container having a wheel assembly mounted thereto which is constructed in accordance with the present invention.

FIG. 2 is an enlarged, fragmentary, side elevation view of the wheel assembly and wheel mounting sleeve of the present invention.

FIG. 3 is a reduced, side elevation view, corresponding to FIG. 2 of the sleeve alone.

FIG. 4 is an end elevation view, in cross section, taken substantially along the plane of line 4—4 in FIG. 3.

FIG. 5 is an end elevation view taken substantially along the plane of line 5—5 of FIG. 3.

FIG. 6 is an end elevation view of the end of the sleeve of FIG. 3 opposite to the end shown in FIG. 5.

FIG. 7 is a bottom plane view of the sleeve of FIG. 3.

FIG. 10 is a bottom plan view of the sleeve of FIG. 9.

FIG. 12 is an end view of the sleeve as shown in FIG. 10.

FIG. 15 is a side elevation view, in cross section, of another alternative embodiment of the wheel mounting sleeve of the present invention.

FIG. 16 is a bottom plan view of the sleeve of FIG. 15.

FIG. 17 is an end elevation view, in cross section, of the sleeve of FIG. 15, taken substantially along the plane of line 17—17 in FIG. 15.

BEST MODE OF CARRYING OUT THE INVENTION

Figure 8:
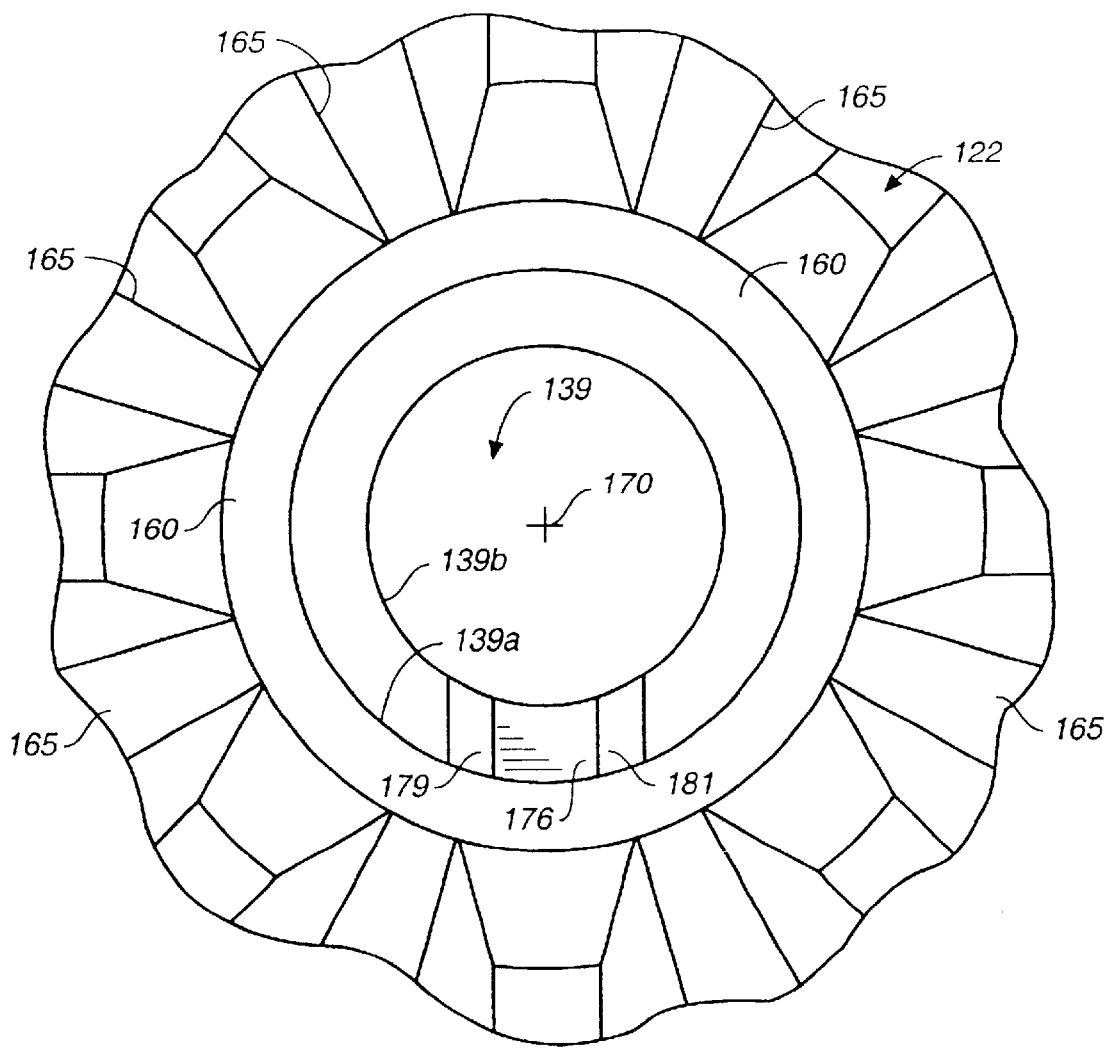
FIG. 8 is an enlarged, fragmentary, end elevation view of the wheel and wheel bearing bore of FIG. 2 with the sleeve removed.
Figure 11:
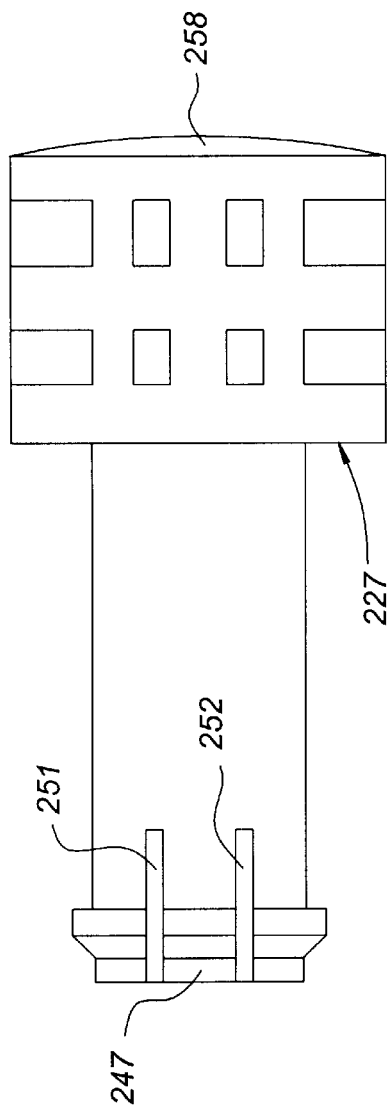
FIG. 11 is a top plan view of the sleeve of FIG. 9.
Figure 9:
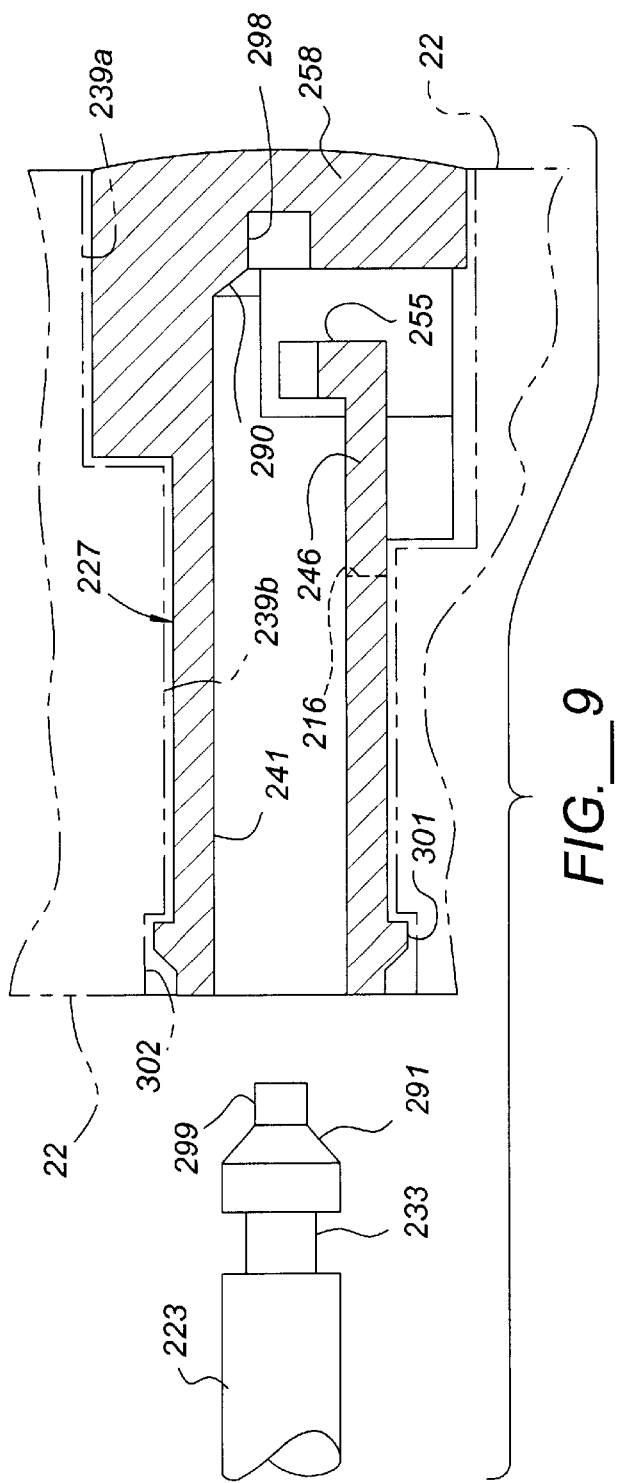
FIG. 9 is a side elevation view in cross section, of an alternative embodiment of the wheel mounting sleeve and axle of the present invention which are particularly suited for use with small wheel assemblies.

The wheel mounting sleeve and wheel assembly of the present invention can be used in connection with numerous wheeled devices. A typical, but not limiting, application is to employ the same in a wheeled refuse cart or container of the general type shown in FIG. 1. Thus, cart 21 includes a pair of wheels 22 mounted on an axle 23 to the lower end of the cart body 29. A hinged lid 24 optionally can be provided, and the cart can be tilted or tipped about the wheels using handle 26 so as to enable rolling of the cart for the transport of refuse, for example, between a location for filling the cart and a location for pickup by a refuse disposal company.

Wheels 22 are secured on axle 23 by a wheel mounting sleeve, generally designated 27. In the refuse cart illustrated, body 29 of the cart includes a wheel well or recess area 28 which receives wheels 22, in part to protect the wheels and in part as a cosmetic structure. Many carts, however, do not include wheel wells as illustrated.

Similar wheeled products which generally are smaller in size include wagons, wheeled food and beverage coolers, barbecues, wheeled toys and small refuse containers. Again, the wheels employed on such devices may be secured to axles using a wheel mounting sleeve, but since the wheels, axles and sleeves are much smaller, problems of stability and durability of the assembly arises as less material is available to couple the components together.

My prior patent applications, which are incorporated in their entireties by reference into the present application, set forth wheel mounting sleeves which are particularly well suited for use on larger diameter axles. The present sleeve assembly has been improved from my prior designs for use on smaller wheeled products with smaller diameter axles, but it will be understood that the present design also may be advantageously employed for large refuse cart applications. The embodiment of FIGS. 1–8 shows adaptation of my improved design to a refuse cart application, while the embodiments of FIGS. 9–17 are specifically intended for use on smaller wheeled products.

Turning now to the improved embodiment of the sleeve and wheel assembly of the present invention, as shown in FIGS. 2–8, it will be seen that a sleeve 127 includes an inner end 137 provided with an annular rib 201 which seats in an annular recess 202 in the inner end 139b of wheel bearing bore 139. Rib 201 has a diameter which is greater than small diameter bore 139b, and the sleeve is press fit down bore 139 until rib 201 resiliently snaps out into recess 202. The same relative dimensions as set forth for the sleeve rib and bore diameter of the embodiments of my prior applications are suitable for the embodiment of FIGS. 2–8 of this application.

In order to facilitate passage of rib 201 down smaller diameter bore 139b, the body of sleeve 127 is preferably axially slotted at inner end 137 at least once. This can best be seen in FIG. 5, wherein two axially extending slots 151 and 152 are provided. Slots 151 and 152 accommodate resilient inward displacement of sleeve end 137 by an amount substantially equal to the interference fit between rib 201 and inner bore portion 139b. Slots 151 and 152 define a finger 147 therebetween which is resiliently inwardly displaceable by an amount, which when combined with the natural resilience of the softer blow molded plastic of wheel 122, will allow press fitting of the sleeve down the bore until the rib can snap out into recess 202 and latch the sleeve to the wheel. In order to facilitate such a press fitting of the sleeve into the wheel, a chamfer 203 preferably can be provided on rib 201.

As best may be seen in FIG. 2, wheel bore 139 is radially stepped and has a large diameter end portion 139a opening to outer side 167 of wheel 122 and a small diameter bore portion 139b, opening to inner side 166 of the wheel. This same radial inward stepping of the sleeve and wheel are also shown for the embodiments of my prior applications.

Wheels employed in refuse carts are typically blow or injection molded plastic wheels with radially extending ribs 165 which converge toward central axis 170 of bore 139. By inwardly stepping bore 139 from the outer or large diameter bore portion 139a to the inner smaller diameter portion 139b, the wheel assembly of the present invention will have greater strength at inner side 166 of the wheel and inner side 137 of the sleeve. This results from the radial convergence of ribs 165 toward axis 170 of the bore (FIG. 8). As inner bore portion 139b is made smaller, ribs 165 become closer together at the annular bearing collar 150 which surrounds bore 139b. An axle which is inserted into sleeve bore 141 will tend to stress inside 166 of the wheel more than the outside 167. As the diameter of the sleeve-receiving bore of the wheel decreases, ribs 165 converge towards bearing collar 150 so as to support bearing collar 150 around sleeve 127 and provide additional strength, as compared to the larger diameter annular bearing collar 160 (FIGS. 2 and 8) on outside 167 of the wheel.

In sleeve assembly 127, end wall 158 of the sleeve is formed with an optional tool passageway 191 which is aligned with extension 183 of resilient finger 146. Extending transversely across passageway 191 is a frangible membrane or puncture skin 195. Membrane 195 visually conceals axle 123 to thereby reduce the likelihood of vandalism. Moreover, passageway 191 is preferably cylindrical and has a lateral dimension which is sufficiently small so as to prevent the entry of most blade-type screwdrivers into the passageway. Instead, a pointed tool such as a "scratch all" or an icepick can be used to puncture membrane or puncture skin 195 and displace latching finger 146 by prying it upwardly. Alternatively, as the pointed tool is driven axially toward the lugs 155 on resilient finger 146, the end of the pointed tool will engage chamfer 134 on the end of axle 123. As the pointed tool is urged axially further, chamfer 134 will force the end of the tool up against finger extension 183 and thereby outwardly displace finger 146 until lugs 155 clear annular notch 133 in the axle. At this point, the wheel and sleeve can be pulled outwardly from the axle and the wheel removed.

Referring now to FIG. 8, wheel 122 can be seen to be formed with a central wheel bearing bore 139 having stepped large diameter bore portion 139a and smaller diameter bore portion 139b. A much smaller radial extending rib 201 is used to latch the sleeve to the wheel, as above described.

The wheel assembly of FIGS. 2–8 is constructed so that the sleeve and wheel are keyed together as a unit. Thus, one of wheel bearing bore 139 and sleeve 127 is formed with a radially projecting key, while the other of the wheel bearing bore and the sleeve is formed with a radially projecting recess. As can be seen from FIG. 8, a pair of outwardly projecting axially extending pockets recesses 179 and 181 are provided in small diameter wheel bearing bore portion 139b. These are spaced apart on either side of the central section 176. The key is preferably provided by a pair of outwardly extending ribs 177 and 178 which are dimensioned to be slidably inserted into notches 181 and 179. This structure keys the sleeve for rotation with the wheel.

As can be seen in FIGS. 2 and 3, resiliently displaceable finger 146 can be downwardly displaced. Such movement is required in order to allow lug or tooth 155 to be displaced laterally as the axle with its tapered end 134 is urged into sleeve 127 before the lug snaps back into axle notch 133. This transverse displacement of axle-engaging finger, however, creates some transverse and axial instability in the axle/sleeve assembly under dynamic loading of the axle.

In order to stabilize the axle inside the sleeve so that it will not downwardly displace latching finger 123 under dynamic loading, the improved sleeve and wheel assembly of the present invention is provided with a stabilizing axle recess 198 in transverse end wall 158 of the sleeve, which recess is dimensioned to receive an axle stub 199 provided on the distal or outer end of axle 123. Axle stub 199, therefore, transversely supports the axle inside sleeve 127 across the gap or length of the axle which includes latching finger 146. Stub end 199 of axle 123 is trapped in recess or pocket 198, and the axle cannot downwardly displace finger 146 and permit wheel 122 to begin to wobble or vibrate dynamically on the axle.

Stabilizing axle 123 inside and relative to sleeve 127 requires an axle which is specially formed with a stub or extension 199, but the result is that the overall assembly is less susceptible to fatigue, stress fractures and accidental releases or unlatchings of the sleeve from the axle. In larger axles, axle recess 198 and stub 199 are not absolutely required since there is enough sleeve material to substantially stabilize axle 123 on the inner end of the sleeve. Providing the stabilizing recess and axle stub, even for larger axles, however, further enhances their stability.

As shown in FIGS. 2–8, axle stub 199 is smaller in diameter than the remainder of the axle, but it will be understood that recess 198 and stub 199 could have the same diameter as the remainder of axle 123, with possibly a chamfer provided on the end of stub 199 to ease assembly. If stub 199 has the same diameter as axle 123, the stub would be defined as that portion of the axle distal the notch 133 whifch is received in recess 198.

In FIGS. 9–17 sleeve assemblies are shown which are particularly well suited for use with smaller wheeled products, such as wagons, coolers and toys. The elements of these sleeves are common to the elements described above in connection with FIGS. 1–8 and corresponding reference numerals, increased by one hundred, have been used for each embodiment.

Sleeve 227 of FIGS. 9–12 is designed for use with a wheel 225 having a stepped wheel bearing bore 239a and 239b with an annular stepped recess 302 analogous to the wheel assembly of FIGS. 2–8. Sleeve 227 is press fit from right to left down bore 139a, 139b until annular sleeve rib 301 snaps out into recess 302. Slots 251 and 252 (FIG. 11) define a resilient finger 247 which can be inwardly displaced in small diameter bore 139b to allow rib 301 to pass down the bore and snap out into the annular recess to secure the sleeve to wheel 222. A second resiliently displaceable finger 246 is provided with a lug or tooth 255 which can be outwardly (downwardly in FIG. 9) displaced to allow axle 232 to be urged from left to right inside sleeve bore 241 until annular axle notch 233 reaches lug 255, at which point finger 246 is displaced outwardly by conical surface 291 and then lug 255 snaps inwardly into notch 233 to secure the sleeve to the axle. Resiliently displaceable finger 246 can be seen from FIG. 10 to be defined by two slots 214 and 216 so that finger 246 is cantilevered from about a mid point of the sleeve and extends axially to terminate short of, but proximate to, a transverse end wall 258 of the sleeve.

In order to stabilize the axle inside sleeve bore 241, sleeve assembly 227 includes a stabilizing axle receiving recess or an axle support bore segment 298 in end wall 258. Recess or bore segment 298 is formed to receive a stub end 299 of axle 223. Thus, the distal end of axle 223 is trapped by recess or bore segment 298 and supported against lateral displacement under transverse loading of axle 223. In the smaller wall thicknesses of sleeve 227 (as compared to the wall thicknesses which can be employed in larger sleeve 127), stabilizing the end of axle 223 in end wall 258 of the sleeve is very important in achieving overall strength and durability of the assembly.

In the preferred form, sleeve 227 includes a tapered surface 290 which matingly receives a tapered surface 291 on axle 223 between axle stub 299 and the larger or nominal diameter of axle 223. Thus, the diameter of axle 223 on the distal side of annular notch 233 can be seen to convergently inwardly taper down to a smaller axle stub diameter. As noted above, this is not an absolute requirement, but it lessens the size of recess or pocket 298 required to stabilize the axle, which maintains the strength of end wall 258.

Most preferably, and in order to minimize vibration and wobble of axle 223 inside sleeve bore 241 and sleeve bore segment 321, the axle and sleeve are dimensioned so that the axle is slidably received in sleeve bore 241 and axle stub 299 is slidably received in recess or axle bore segment 298. The axle is therefore supported laterally by the sleeve on both sides of laterally displaceable finger 246.

Figure 13:
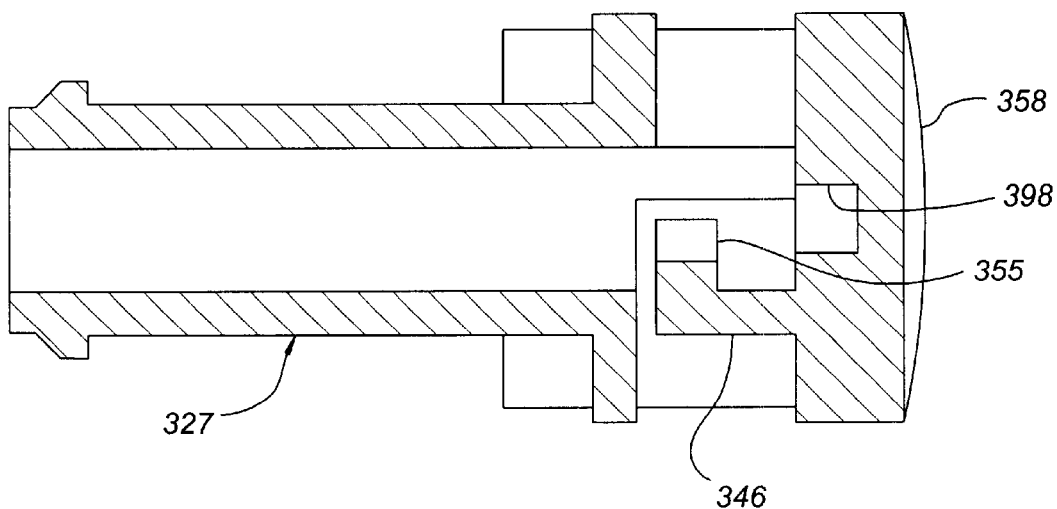
FIG. 13 is a side elevation view in cross section of a further alternative embodiment of the wheel mounting sleeve of the present invention.
Figure 14:
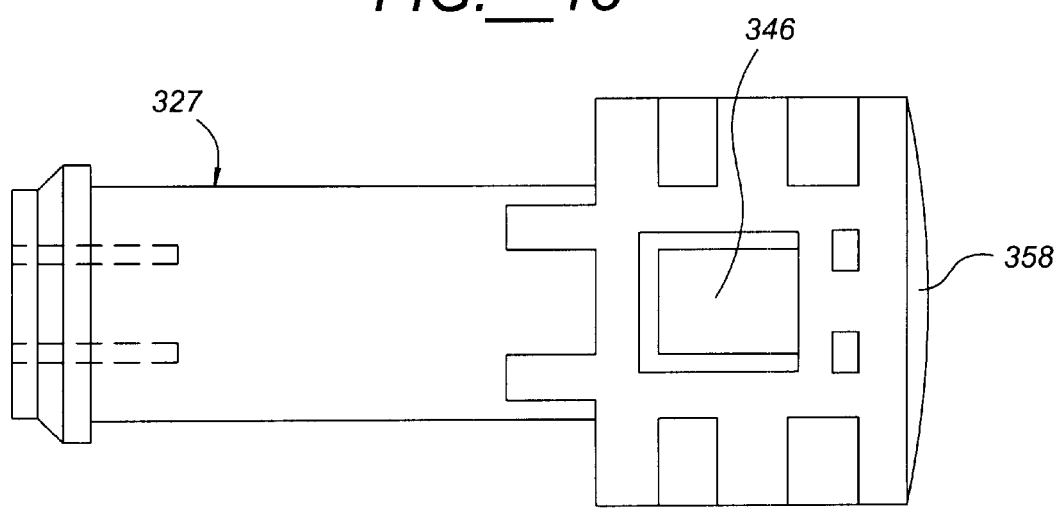
FIG. 14 is a bottom plan view of the sleeve of FIG. 12.

Sleeve 327 of FIGS. 13 and 14 is constructed in a manner which is similar to that of sleeve 227 of FIGS. 9–12. In sleeve 327, however, resilient axle-engaging finger 246 of sleeve 227 has been replaced by a resilient axle engaging finger 346. Finger 346 again extends axially along the sleeve and includes a lug 355, but the finger is cantilevered from sleeve end wall 358. Sleeve 327 is designed for use with the same notched axle as axle 223 of FIG. 9, and axle stub 299 is slidably received in stabilizing recess 398 in end wall 358 of sleeve 327.

Modified sleeve 427 of FIGS. 15–17 illustrates another form of axle-engaging finger in combination with a stabilizing recess or bore segment. Thus, sleeve 427 includes a finger 446 which is circumferentially cantilever proximate end wall 458, as best may be seen in FIGS. 16 and 17. Finger 446 again includes a lug 455 which snaps into axle recess 233 as stub 299 seats in stabilizing pocket 498.

In modified sleeve 427, a single axially extending rib 477 has replaced the pairs of ribs, such as ribs 177 and 178 in FIGS. 3 and 4, which ribs are used to key the sleeve against rotation relative to the wheel.

It would also be possible to key the mounting sleeve of the present invention to the axle. This would cause the axle, sleeve and wheel to rotate together as a unit. Again, sleeve 427 is designed for use with a notched axle having an axle stub, such as axle 223 of FIG. 9, which can be slidably received in stabilizing recess 498 in end wall 458. Recess 498 provides a lateral support surface for the axle on the distal end of the axle in the area of the laterally displaceable axle-engaging finger 446.

The foregoing description of specific embodiments of the present invention has been presented for the purpose of illustration. It is not intended to be exhaustive or to limit the invention to precise forms disclosed, and obviously many modifications and variations are possible in light of the above teaching. The embodiments were chosen and described in order to best explain the principles of the invention and its practical application in order to thereby enable others skilled in the art to best utilize the invention and various embodiments with various modifications as are suited to the particular use contemplated. It is intended that the scope of the invention be defined by the claims appended hereto, when read and interpreted according to accepted legal principles such as the doctrine equivalents and reversal of parts.

What is claimed is:

1. A wheel mounting sleeve comprising:
    a sleeve body having an inner end and an outer end and formed and dimensioned for mounting through a wheel bearing bore in a wheel, said sleeve body further having an axially extending sleeve bore dimensioned for mounting in telescoped relation over an axle;
    said sleeve body having at least one axle-engaging shoulder thereon retaining said sleeve on the axle and at least one wheel-engaging shoulder thereon retaining the wheel on said sleeve; and
    said sleeve body includes a transversely extending end wall, and said sleeve bore extending axially into said end wall to provide an axle support bore segment in said end wall for support of transverse loads on the axle by said sleeve.

2. The wheel mounting sleeve as defined in claim 1 wherein,
    the axle support bore segment extends only partially into said end wall to provide a closed end extending across the end of the axle.

3. The wheel mounting sleeve as defined in claim 1 wherein,
    said axle support bore segment has a diameter less than a diameter of a remainder of said sleeve bore.

4. The wheel mounting sleeve as defined in claim 3 wherein,
    an end of said remainder of said sleeve bore convergently tapers to the smaller diameter of said axle support bore segment.

5. The wheel mounting sleeve as defined in claim 1 wherein,
    said sleeve bore slidably engages the axle;
    said axle-engaging shoulder is provided on a resiliently outwardly displaceable finger positioned proximate said end wall; and
    said axle support bore segment in said end wall slidably engages the end of the axle.

6. The wheel mounting sleeve as defined in claim 5 wherein,
    said resiliently outwardly displaceable finger is cantilevered to extend axially along said sleeve body to a position proximate said end wall.

7. The wheel mounting sleeve as defined in claim 6 wherein,
    said resiliently outwardly displaceable finger is cantilevered from said end wall.

8. The wheel mounting sleeve as defined in claim 6 wherein,
    said resiliently outwardly displaceable finger is cantilevered from proximate a mid-length of said sleeve body and terminates short of said end wall.

9. The wheel mounting sleeve as defined in claim 5 wherein,
    said resiliently outwardly displaceable finger is circumferentially cantilevered from said sleeve body proximate said end wall.

10. A wheel assembly comprising:
    an axle having a circumferentially extending notch proximate and inwardly of an outer end thereof;

a wheel having a central wheel bearing bore extending therethrough from an inner side to an outer side of said wheel;

a wheel mounting sleeve having a sleeve body formed with a sleeve bore dimensioned for, and slidably mounted over, said axle; said sleeve body having an outer diameter formed for, and slidably inserted into, said wheel bearing bore; said sleeve body further being formed with at least one axle-engaging shoulder thereon retaining said sleeve on said axle and at least one wheel-engaging shoulder thereon retaining said wheel on said sleeve; and said sleeve body further including a transversely extending end wall, and an axle stabilizing recess in said end wall axially aligned with said sleeve bore and receiving said outer end of said axle, said axle stabilizing recess being dimensioned to support transverse loads on said axle.

11. The wheel assembly as defined in claim 10 wherein, said axle has an axle stub at said outer end having a diameter less than a diameter of said axle on both sides of said notch, said axle stub being slidably received in said axle stabilizing recess in said end wall.

12. The wheel assembly as defined in claim 11 wherein, said axle convergently tapers from a diameter proximate said notch to the smaller diameter of said axle stub.

13. The wheel assembly as defined in claim 12 wherein, said sleeve body convergently tapers to mate with the convergent taper of said axle.

14. The wheel assembly as defined in claim 10 wherein, said sleeve bore slidably engages said axle; said axle-engaging shoulder is provided on a resiliently outwardly displaceable finger positioned proximate said end wall; and said axle stabilizing recess in said end wall slidably engages said outer end of said axle.

15. The wheel assembly as defined in claim 14 wherein, said resiliently outwardly displaceable finger is cantilevered to extend axially along said sleeve body to a position proximate said end wall.

16. The wheel assembly as defined in claim 15 wherein, said resiliently outwardly displaceable finger is cantilevered from said end wall.

17. The wheel assembly as defined in claim 15 wherein, said resiliently outwardly displaceable finger is cantilevered from proximate a mid-length of said sleeve body and terminates short of said end wall.

18. The wheel mounting sleeve as defined in claim 14 wherein, said resiliently outwardly displaceable finger is circumferentially cantilevered from said sleeve body proximate said end wall.

19. An axle for use with a wheel assembly comprising: an axle body dimensioned for slidable receipt of a wheel assembly thereover, said axle body having a circumferentially extending notch proximate and inward of an outer end of said axle body, said notch being defined by shoulders positioned for engagement by the wheel assembly to secure the wheel assembly to said axle body, and said body being formed with an axially protruding axle stub on said outer end of said axle body, said axle stub being of smaller diameter than said axle body and being dimensioned to be slidably inserted into a recess provided in an end wall of the wheel assembly.

20. The axle as defined in claim 19 wherein, the end of said axle body is tapered in a direction toward the axle stub.

* * * * *